(12) United States Patent
Van Duyn et al.

(10) Patent No.: US 10,352,761 B2
(45) Date of Patent: Jul. 16, 2019

(54) PIEZO ACTUATED HIGH SPEED AIR VALVE USED FOR BLADE AND COMPONENT EXCITATION

(71) Applicant: United Technologies Corporation, Farmington, CT (US)

(72) Inventors: Keven G. Van Duyn, Bloomfield, CT (US); Todd M. Currier, Enfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 159 days.

(21) Appl. No.: 15/242,868

(22) Filed: Aug. 22, 2016

(65) Prior Publication Data

US 2018/0052039 A1 Feb. 22, 2018

(51) Int. Cl.
*G01H 1/00* (2006.01)
*G01M 7/02* (2006.01)
(Continued)

(52) U.S. Cl.
CPC ............... *G01H 1/006* (2013.01); *F01D 5/16* (2013.01); *F01D 21/003* (2013.01); *F16K 31/004* (2013.01); *G01M 7/027* (2013.01); *G01M 15/14* (2013.01); *F05D 2220/32* (2013.01); *F05D 2260/12* (2013.01); *F05D 2260/16* (2013.01); *F05D 2260/407* (2013.01);
(Continued)

(58) Field of Classification Search
CPC ......... G01H 1/006; F01D 5/16; F01D 21/003; F16K 31/004; G01M 7/027; G01M 15/14
See application file for complete search history.

(56) References Cited

U.S. PATENT DOCUMENTS 2,961,829 A * 11/1960 Weisenbach ............ F16H 39/00
60/454
3,214,085 A * 10/1965 Boldt ...................... F02B 71/04
123/46 R
(Continued)

FOREIGN PATENT DOCUMENTS

WO 2013058704 A1 4/2013

OTHER PUBLICATIONS

European Search Report for EP 17187197.3 dated Feb. 21, 2018; 12 pages.

*Primary Examiner* — Helen C Kwok
(74) *Attorney, Agent, or Firm* — Cantor Colburn LLP (57) ABSTRACT

A piezo-actuated valve, system, and method of exciting gas turbine turbomachinery are provided. The piezo-actuated valve includes a valve body extending along a first axis between a first and second end, the valve body defining a first opening near the first end, a second opening near the second end, a third opening centrally located on the valve body, and a valve cavity between the first opening and the second opening, a tube connected to the third opening and extending from the valve body along a second axis transverse to the first axis, a shuttle valve assembly slidably disposed within the valve body, wherein the shuttle valve slides between the first end to a first stopper and the second end to a second stopper, a first piezo injector having an injector tip extending through the first opening, and a second piezo injector having an injector tip extending through the second opening.

19 Claims, 6 Drawing Sheets

(51) Int. Cl.
*F01D 21/00* (2006.01)
*F16K 31/00* (2006.01)
*G01M 15/14* (2006.01)
*F01D 5/16* (2006.01)

(52) U.S. Cl.
CPC ...... *F05D 2260/60* (2013.01); *F05D 2260/83* (2013.01); *F05D 2260/962* (2013.01); *F05D 2270/334* (2013.01); *F05D 2270/65* (2013.01)

(56) References Cited

U.S. PATENT DOCUMENTS

| | | | | |
|---|---|---|---|---|
| 3,583,443 | A * | 6/1971 | Beckett | F15B 13/0402 137/625.63 |
| 3,712,339 | A * | 1/1973 | Bartholomaus | F15B 13/0438 137/625.62 |
| 3,804,120 | A * | 4/1974 | Garnett | F15B 13/0433 137/625.64 |
| 4,298,181 | A * | 11/1981 | Corrado | F15B 13/0431 137/625.64 |
| 4,301,825 | A * | 11/1981 | Simko | F02B 19/1085 123/275 |
| 4,441,587 | A * | 4/1984 | Patten | F04B 17/05 188/70 R |
| 4,502,445 | A * | 3/1985 | Roca-Nierga | F02M 59/366 123/458 |
| 4,724,801 | A * | 2/1988 | O'Neill | F01L 25/06 123/90.11 |
| 4,921,209 | A * | 5/1990 | Moineau | B05B 12/02 137/624.11 |
| 4,971,106 | A * | 11/1990 | Tsutsui | G05D 23/1393 137/597 |
| 5,090,378 | A * | 2/1992 | Gonzalez | F02B 19/108 123/275 |
| 5,148,735 | A * | 9/1992 | Veletovac | F15B 13/043 137/625.64 |
| 5,484,104 | A * | 1/1996 | Kukler | F02M 49/02 123/496 |
| 6,076,555 | A * | 6/2000 | Hettinger | F15C 5/00 137/625.65 |
| 7,273,107 | B2 * | 9/2007 | Hiron | E21B 34/08 166/373 |
| 8,132,588 | B1 * | 3/2012 | Langenfeld | F16K 11/048 137/100 |
| 9,347,466 | B2 * | 5/2016 | Hoglund | F01L 9/02 |
| 2005/0241302 | A1 * | 11/2005 | Weber | F01L 13/0015 60/311 |
| 2005/0287021 | A1 * | 12/2005 | Ferleyko | F04B 49/24 417/417 |
| 2007/0075286 | A1 | 4/2007 | Tanner | |
| 2007/0272311 | A1 * | 11/2007 | Trocki | A61M 39/223 137/601.2 |
| 2015/0167539 | A1 * | 6/2015 | Basile | F02B 29/0468 60/599 |

* cited by examiner

PIEZO ACTUATED HIGH SPEED AIR VALVE USED FOR BLADE AND COMPONENT EXCITATION

BACKGROUND

Gas turbine engine blades are subject to various sources of excitation that may result in both natural modes and aero elastic responses. Engine testing and bench testing are used during gas turbine engine development testing to assess these modes and responses, as well as the amount of damping available to determine part stability. The engine testing and bench testing may operate the gas turbine engine at pressures and velocities that may induce blade flutter or other aero elastic phenomena that may negatively impact gas turbine engine performance.

The engine testing and bench testing may use shaker tables, airflow rigs, and strain gauged blades to study the dynamics and the actual operating environment. One form of excitation that is used in both engine testing and bench testing is the introduction of pulsed airstreams that emanate from probes positioned and timed to emit air pulses as the blades pass behind the probe. The timing and the accuracy of the delivery of the emitted air pulse is important to artificially excite the blades. The frequency of the emitted air pulse is limited due to the inertia and mechanical valves, or the speed at which the magnetically actuated valve can operate, or other limitations that may limit the frequency of the air pulses.

For example, blade flutter testing that uses a steady stream of air or fluid pulsations ejected from a set of probes ahead of a set of rotating blades has been done using electromagnetically controlled valves, but this system is limited in frequency to around 100 to 300 hz. However, there is a desire for air pulses that can be emitted at or above 1000 Hz. Further, there is a desire for air pulses that can be precisely timed to skew the pulses or advance and/or delay the pulses relative to other probes equally spaced around the blade set which requires extremely accurate timing and valve operation.

Accordingly, it is desirable to provide an improved way to provide air or fluid pulses to excite turbomachinery with superior timing.

SUMMARY

According to one embodiment, a piezo-actuated valve is provided. The piezo-actuated valve includes a valve body extending along a first axis between a first end and a second end, the valve body defining a first opening disposed proximate the first end, a second opening disposed proximate the second end, a third opening centrally located on the valve body, and a valve cavity disposed between the first opening and the second opening, a tube connected to the third opening and extending from the valve body along a second axis disposed transverse to the first axis, a shuttle valve assembly slidably disposed within the valve body, wherein the shuttle valve in configured to slide between the first end to a first stopper and the second end to a second stopper, a first piezo injector having an injector tip extending through the first opening, and a second piezo injector having an injector tip extending through the second opening.

In addition to one or more of the features described above, or as an alternative, further embodiments may include, wherein the tube defines a passageway extending between an inlet and an outlet.

In addition to one or more of the features described above, or as an alternative, further embodiments may include, wherein the tube further includes an exhaust port configured to allow a fluid pulse from at least one of the first piezo injector and the second piezo injector to escape when the shuttle valve assembly slidably moves between the first end and the second end.

In addition to one or more of the features described above, or as an alternative, further embodiments may include, wherein the shuttle valve assembly is movable between a first position at a first end in which the shuttle valve assembly inhibits fluid flow through a passageway of the tube through the third opening, a second position at the center of the valve body in which an aperture of the shuttle valve assembly is at least partially disposed within the passageway to facilitate fluid flow through the passageway, and a third position at a second end in which the shuttle valve assembly inhibits fluid flow through the passageway of the tube through the third opening.

In addition to one or more of the features described above, or as an alternative, further embodiments may include, wherein the first piezo injector is configured to selectively provide a first fluid pulse to move the shuttle valve assembly from the first position towards the second position and third position.

In addition to one or more of the features described above, or as an alternative, further embodiments may include, wherein the second piezo injector is configured to selectively provide a second fluid pulse to move the shuttle valve assembly from the third position towards the second position and the first position.

In addition to one or more of the features described above, or as an alternative, further embodiments may include, wherein the first stopper defines a first hard stop disposed opposite the second stopper, the first hard stop configured to engage the shuttle valve assembly to inhibit further travel of the shuttle valve assembly towards the first position.

In addition to one or more of the features described above, or as an alternative, further embodiments may include, wherein the second stopper defines a second hard stop disposed opposite the first stopper, the second hard stop configured to engage the shuttle valve assembly to inhibit further travel of the shuttle valve assembly towards the third position.

In addition to one or more of the features described above, or as an alternative, further embodiments may include, wherein the valve body defines a plurality of vent ports radially extending through the valve body and disposed adjacent to the third opening, the plurality of vent ports fluidly connects the exhaust port.

According to one or more embodiments, a pulse device for exciting gas turbine engine turbomachinery is provided. The pulse device includes a piezo-actuated valve having a valve body defining a first opening at a first end, a second opening at a second end, a valve cavity disposed between the first opening and the second opening, and a third opening disposed midway through the valve cavity, a tube connected to the third opening and extending from the valve body, and a shuttle valve assembly slidably disposed within the valve body, wherein the shuttle valve in configured to slide between the first end to a first stopper and the second end to a second stopper, a first piezo injector having an injector tip extending through the first opening, a second piezo injector having an injector tip extending through the second opening, a delivery system fluidly connected to the first piezo injector and the second piezo injector, and a control system operatively connected to the first piezo injector and the second piezo injection, configured to actuate the first piezo injector to provide a first fluid pulse and the second piezo injector to provide a second fluid pulse.

In addition to one or more of the features described above, or as an alternative, further embodiments may include, wherein the tube defines a passageway extending between an inlet fluidly connected to a fluid source and an outlet that faces towards a blade of a gas turbine engine.

In addition to one or more of the features described above, or as an alternative, further embodiments may include, wherein the shuttle valve assembly is movable between a first position at a first end in which the shuttle valve assembly inhibits fluid flow through a passageway of the tube through the third opening, a second position at the center of the valve body in which an aperture of the shuttle valve assembly is at least partially disposed within the passageway to facilitate fluid flow through the passageway, and a third position at a second end in which the shuttle valve assembly inhibits fluid flow through the passageway of the tube through the third opening.

In addition to one or more of the features described above, or as an alternative, further embodiments may include, wherein in response to the control system providing a first activation signal to the first piezo injector, the first piezo injector provides the first fluid pulse to the shuttle valve assembly to move the shuttle valve assembly from the first position towards the second position and third position.

In addition to one or more of the features described above, or as an alternative, further embodiments may include, wherein in response to the control system providing second activation signal to the second piezo injector, the second piezo injector provides the second fluid pulse to the shuttle valve assembly to move the shuttle valve assembly from the third position towards the second position and first position.

In addition to one or more of the features described above, or as an alternative, further embodiments may include, wherein the valve body defines a plurality of vent ports radially extending through the valve body and disposed adjacent to the third opening, the plurality of vent ports fluidly connects an exhaust port.

In addition to one or more of the features described above, or as an alternative, further embodiments may include, wherein the first activation signal and the second activation signal is based on at least one of a rotational speed of a gas turbine engine speed and a condition of the gas turbine engine.

In addition to one or more of the features described above, or as an alternative, further embodiments may include, wherein the first piezo injector has an operating frequency up to 6000 Hz, and wherein the second piezo injector has operating frequency up to 6000 Hz.

In addition to one or more of the features described above, or as an alternative, further embodiments may include, wherein the delivery system is configured to provide a high pressure working fluid to the first piezo injector and the second piezo injector.

According to another embodiment, a method of exciting gas turbine turbomachinery blades is provided. The method includes providing a piezo-actuated valve having a valve body defining a valve cavity disposed between a first opening and a second opening, a tube extending from the valve body from a third opening in the center of the valve body defining a passageway extending between an inlet and an outlet, a shuttle valve assembly disposed within the valve cavity slidably disposed within the valve body, wherein the shuttle valve in configured to slide between the first end to a first stopper and the second end to a second stopper, a first piezo injector having an injector tip extending through the first opening, and a second piezo injector having an injector tip extending through the second opening, and positioning the outlet of the tube proximate a blade of a gas turbine engine.

In addition to one or more of the features described above, or as an alternative, further embodiments may include, actuating the first piezo injector, providing a first fluid pulse to shuttle valve assembly from the first piezo injector, moving the shuttle valve assembly between a first position at a first end in which the shuttle valve assembly inhibits fluid flow through a passageway of the tube through the third opening to a second position at the center of the valve body in which an aperture of the shuttle valve assembly is at least partially disposed within the passageway to facilitate fluid flow through the passageway, and a third position at a second end in which the shuttle valve assembly inhibits fluid flow through the passageway of the tube through the third opening, pulsing fluid flow through the passageway when the shuttle valve is in the second position, exciting the blade of the gas turbine engine, actuating the second piezo injector, providing a second fluid pulse to shuttle valve assembly from the second piezo injector, moving the shuttle valve assembly between a third position, second position, and first position, pulsing fluid flow through the passageway when the shuttle valve is in the second position, and exciting the blade of the gas turbine engine.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

One or more embodiments described herein are directed to using piezo injector technology coupled with a microprocessor and amplifier to accurately trigger the piezo electric injectors. Specifically, one or more embodiments includes a shuttle valve being powered by the timed ejection of a high pressure fluid (such as kerosene or jet fuel) from a first high pressure piezo actuator (injector) that propels the lightweight shuttle within a narrowed section across an air and/or fluid passage allowing for a momentary valve "open" condition and thus permits a pulse of air and/or fluid to pass through the valve. The shuttle continues to move and then closes the passage coming to rest at the other end of the valve. The microcontroller then actuates a second piezo injector, which is also part of the valve assembly, reversing the direction of the shuttle valve across the opening again, producing another pulse. According to one or more embodiments, when the injector pressure is very high, the movement of the lightweight shuttle is exceptionally fast, providing pulses up to 6000 Hz. Further, according to other embodiments, precise timing of the piezo allows for pulse skewing and other types of pulse manipulation (duration, sequencing, etc.) for a broad range of tests.

Figure 1:
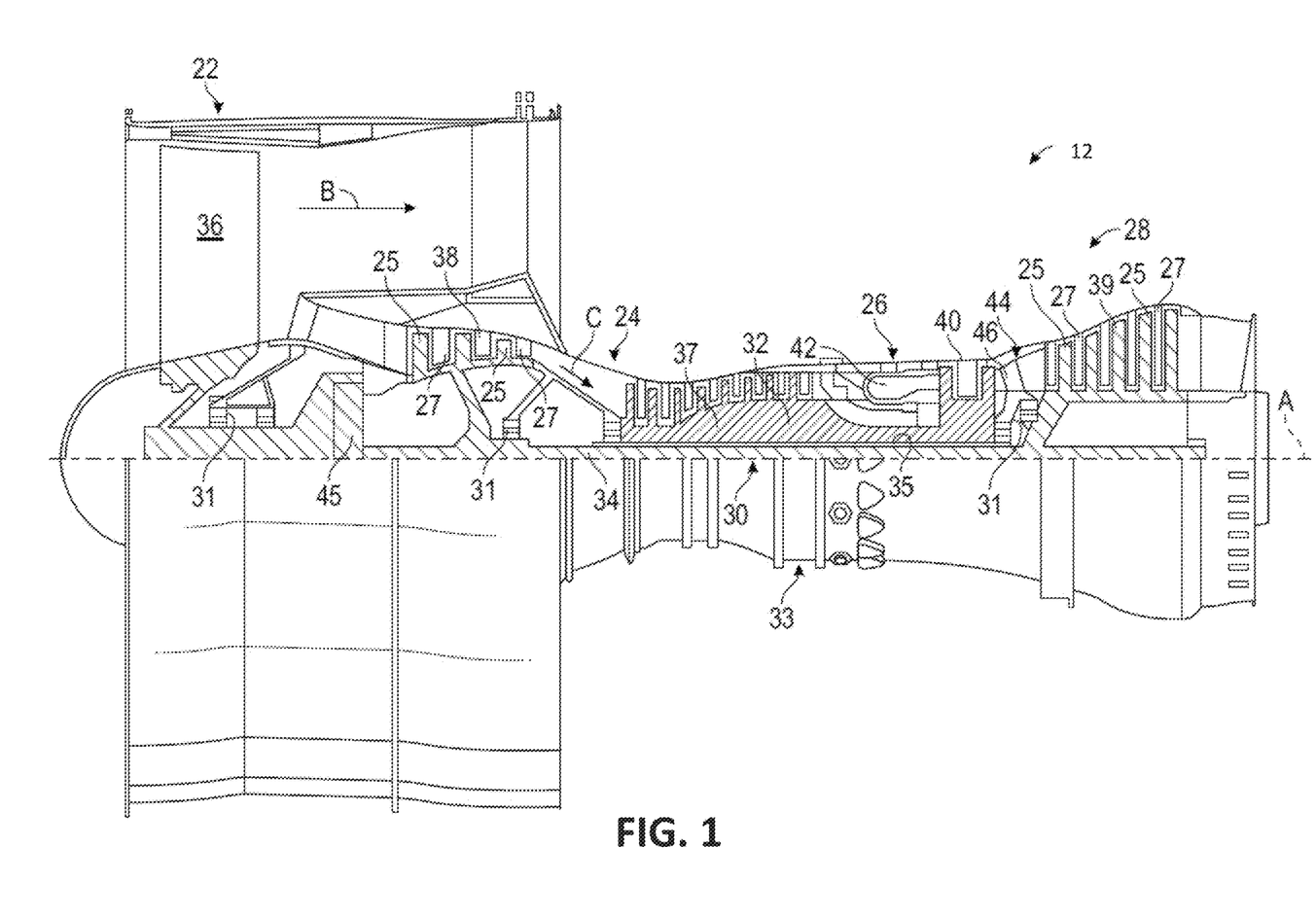
FIG. 1 is a schematic cross-sectional illustration of a gas turbine engine that may employ various embodiments disclosed herein.

For example, turning now to FIG. 1, a schematic cross-sectional view of a gas turbine engine 12 is shown in accordance with one or more exemplary embodiments.

Specifically, FIG. 1 schematically illustrates a gas turbine engine 12 that is a two-spool turbofan engine that generally incorporates a fan section 22, a compressor section 24, a combustor section 26, and a turbine section 28. Alternative engines might include an augmenter section (not shown) among other systems for features. The fan section 22 drives air and/or fluid along a bypass flow path B, while the compressor section 24 drives air and/or fluid along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 12 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In this embodiment of the example gas turbine engine 12, a significant amount of thrust is provided by the bypass flow path B due to the high bypass ratio. Each of the compressor section 24 and the turbine section 28 may include alternating rows of rotor assemblies and vane assemblies that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 12 along the core flow path C. The vanes 27 of the vane assemblies direct the core airflow to the blades 25 to either add or extract energy.

Accordingly, the gas turbine engine 12 includes blades at many different points that can be tested for blade flutter using the disclosed one or more embodiments that use a piezo-actuated air valve for blade and component excitation. Specifically, one or more blades in the gas turbine engine 12 can be tested using an air pulse device for exciting gas turbine engine turbomachinery blades as shown in FIG. 2.

Figure 2:
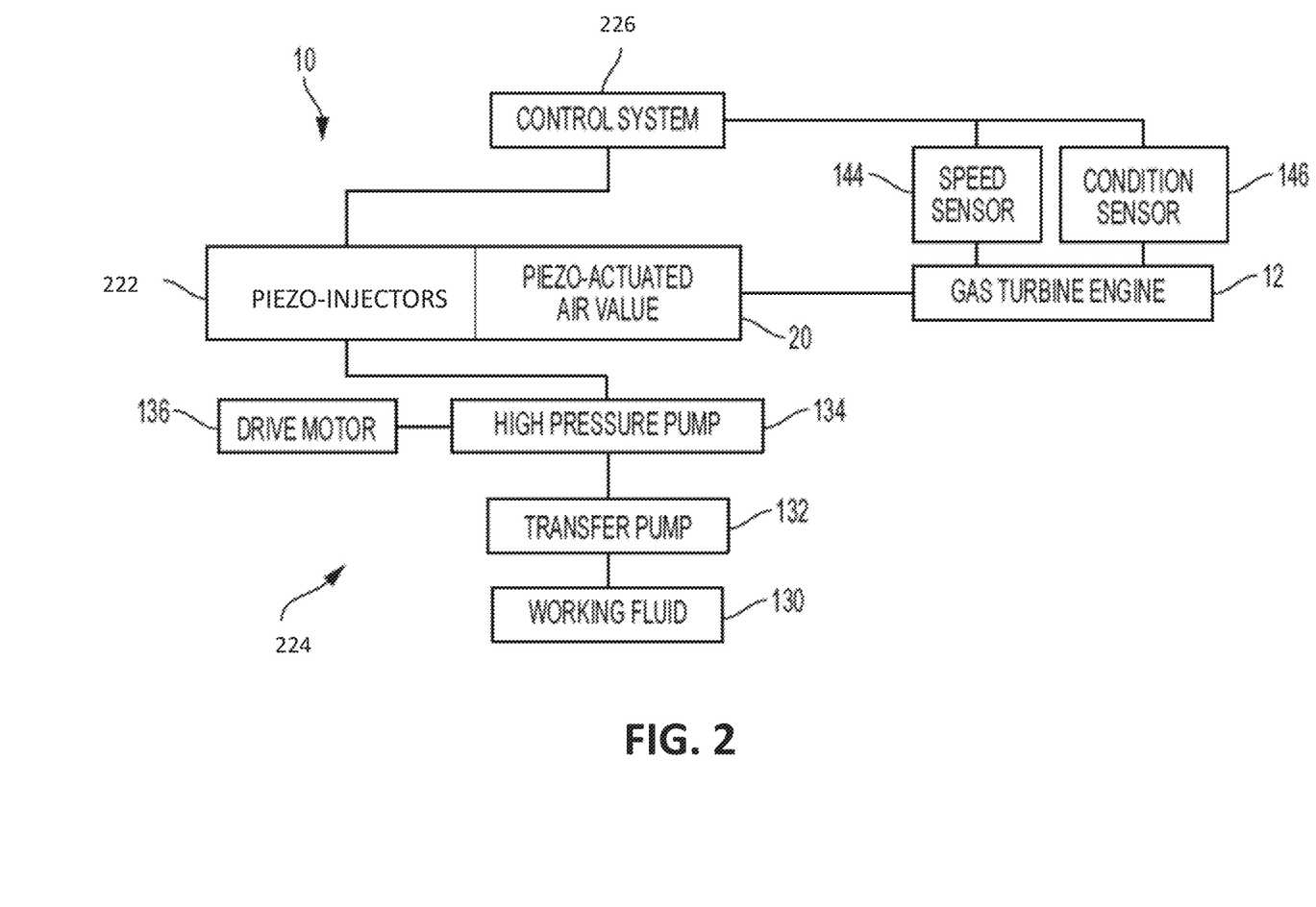
FIG. 2 is a block diagram schematic of an air/fluid pulse device for exciting gas turbine engine turbomachinery blades that may employ various embodiments disclosed herein.

FIG. 2 is a block diagram schematic of an air/fluid pulse device 10 for exciting gas turbine engine turbomachinery blades that may employ various embodiments disclosed herein. The pulse device 10 is provided as part of test equipment to assess or determine natural modes in aero elastic responses of at least one blade of a gas turbine engine 12. The pulse device 10 is capable of precisely actuating a valve to pulse a stream of air and/or fluid that is directed towards at least one blade of gas turbine engine at frequencies up to 6000 Hz. The pulse device 10 includes a piezo-actuated valve 20, piezo injectors 222, a delivery system 224, and a control system 226.

The piezo injectors 222 are fluidly connected to the delivery system 224 and are operatively connected to the control system 226. The delivery system 224 is configured to provide a high pressure working fluid such as air and/or fluid to the piezo injector 222. The delivery system 224 is configured to transfer a working fluid 130 via a transfer pump 132 to a high pressure pump 134 that is driven by a drive motor 136 to increase the operating pressure of the working fluid 130 that is supplied to the piezo injector 222. In at least one embodiment, a high pressure rail is disposed between the high pressure pump 134 and an inlet of the piezo injector 222 to deliver the high pressure working fluid 130 to the piezo injector 222.

The control system 226 is configured to selectively excite or actuate the valve of the piezo injectors 222 to provide a high pressure fluid pulse. The control system 226 is in communication with a speed sensor 144 and a condition sensor 146. The speed sensor 144 is configured to provide a signal indicative of a rotational speed of the gas turbine engine 12 to the control system 226. In at least one embodiment, the speed sensor 144 is configured to provide a signal indicative of a rotational speed of a blade of the gas turbine engine 12 to the control system 226. The speed sensor 144 may be a variable reluctance sensor, a Hall Effect sensor, an eddy current sensor, a radar sensor, a light sensor, a LIDAR sensor, an accelerometer, or the like.

The condition sensor 146 is configured to provide a signal indicative of a condition of the gas turbine engine 12 or a blade of the gas turbine engine 12. The condition may be a vibratory motion of the blade, oscillatory motion of the blade, a temperature of the gas turbine engine 12, stage pressure of the gas turbine engine 12, and force applied to the blade, or the like. The condition sensor 146 may be an optical sensor, a strain gauge, a cool light sensor, a pressure pad, a high-speed camera system, or the like.

The control system 226 is configured to provide an activation signal to the Piezo injectors 222 that are based on at least one of the signal indicative of the rotational speed of the gas turbine engine 12 and the signal indicative of the condition of the gas turbine engine 12 or the blade of the gas turbine engine 12. The activation signal controls the volume, timing, duration, width, amount of energy imparted, or the like of the fluid pulse.

Figure 3:
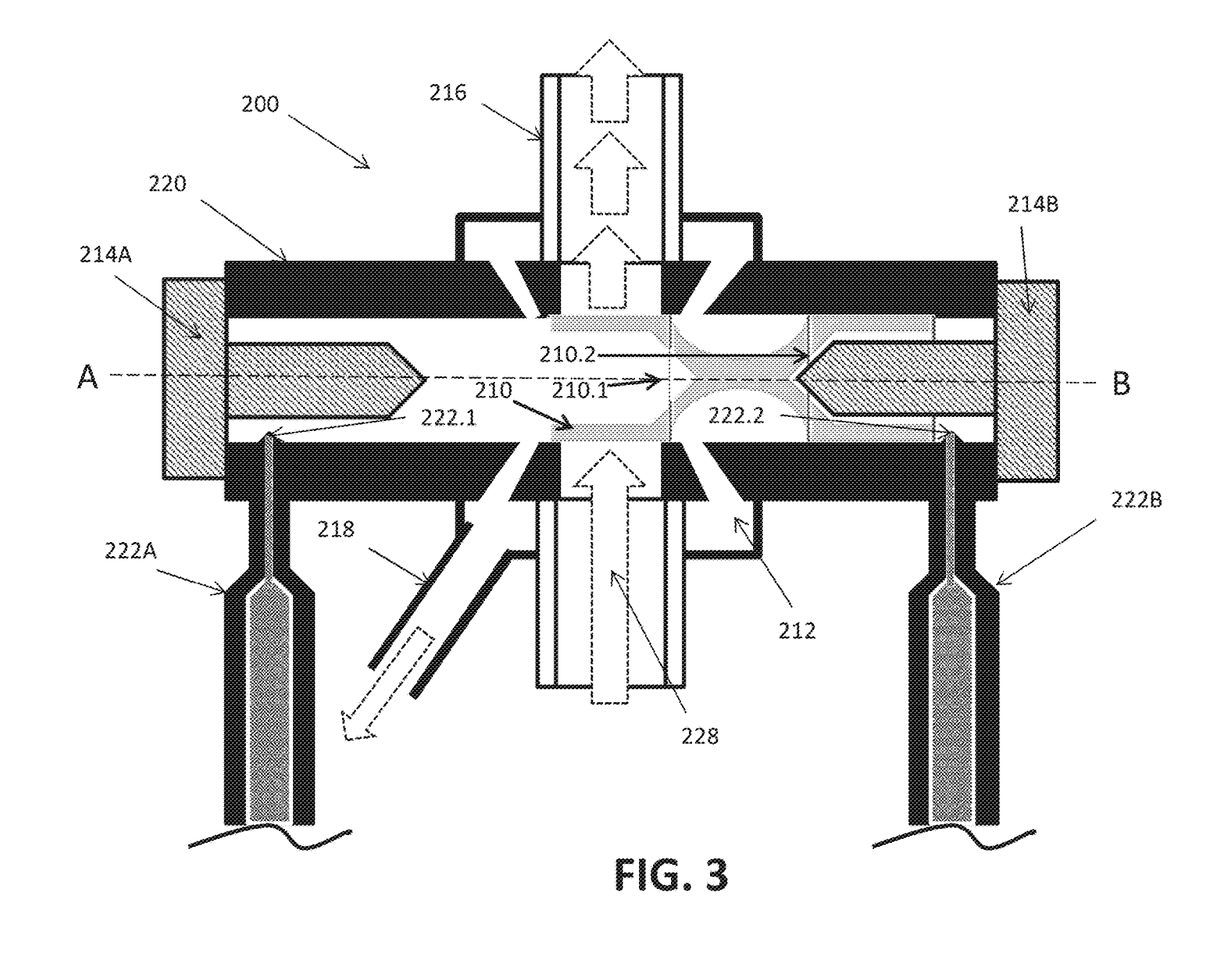
FIG. 3 is a partial cross-sectional view of a piezo-actuated valve in a first position in accordance with one or more embodiments of the present disclosure.

FIG. 3 is a partial cross-sectional view of a piezo-actuated valve 200 in a first position in accordance with one or more embodiments of the present disclosure. The piezo-actuated valve 200 includes a valve body 220 extending along a first axis A-B between a first end A and a second end B.

The valve body 220 includes a first opening 222.1 located proximate the first end A. The valve body 220 also includes, a second opening 222.2 located proximate the second end B. The vale body also includes a third opening centrally located on the valve body 220. Further, the valve body includes a valve cavity disposed between the first opening and the second opening.

According to one or more embodiments, a displacement volume of the actuation shuttle valve does not exceed the ability of a single piezo-injector pulse volume, so that stroke and diameter are related to injector size and type. Said another way, the diameter and length of stroke of the shuttle valve do not exceed the volume of working fluid that can be provided by the injector pulse cycle for each directional displacement of the shuttle valve.

The piezo-actuated valve 200 also includes a tube 216 connected to the third opening and extending from the valve body 220 along a second axis disposed transverse to the first axis A-B. The tube 216 defines a passageway 228 extending between an inlet and an outlet. According to one or more embodiments, air and/or fluid are passed through this passageway 228 under, for example, 250 PSI of pressure. The tube further includes an exhaust port 218 configured to allow a fluid pulse from at least one of the first piezo injector and the second piezo injector to escape when the shuttle valve assembly 210 slidably moves between the first end A and the second end B.

The piezo-actuated valve 200 also includes a shuttle valve assembly 210 slidably disposed within the valve body. The shuttle valve 210 in configured to slide between the first end A to a first stopper 214A and the second end B to a second stopper 214B. The shuttle valve assembly 210 includes a first pocket 210.1 that acts as a deceleration damper causing deceleration when the shuttle valve assembly 210 moves from one end to the other. Similarly, the shuttle valve assembly 210 also includes a symmetrically provided second pocket 210.2 that also serves as a deceleration damper when the shuttle valve assembly moves the other direction.

Figure 5:
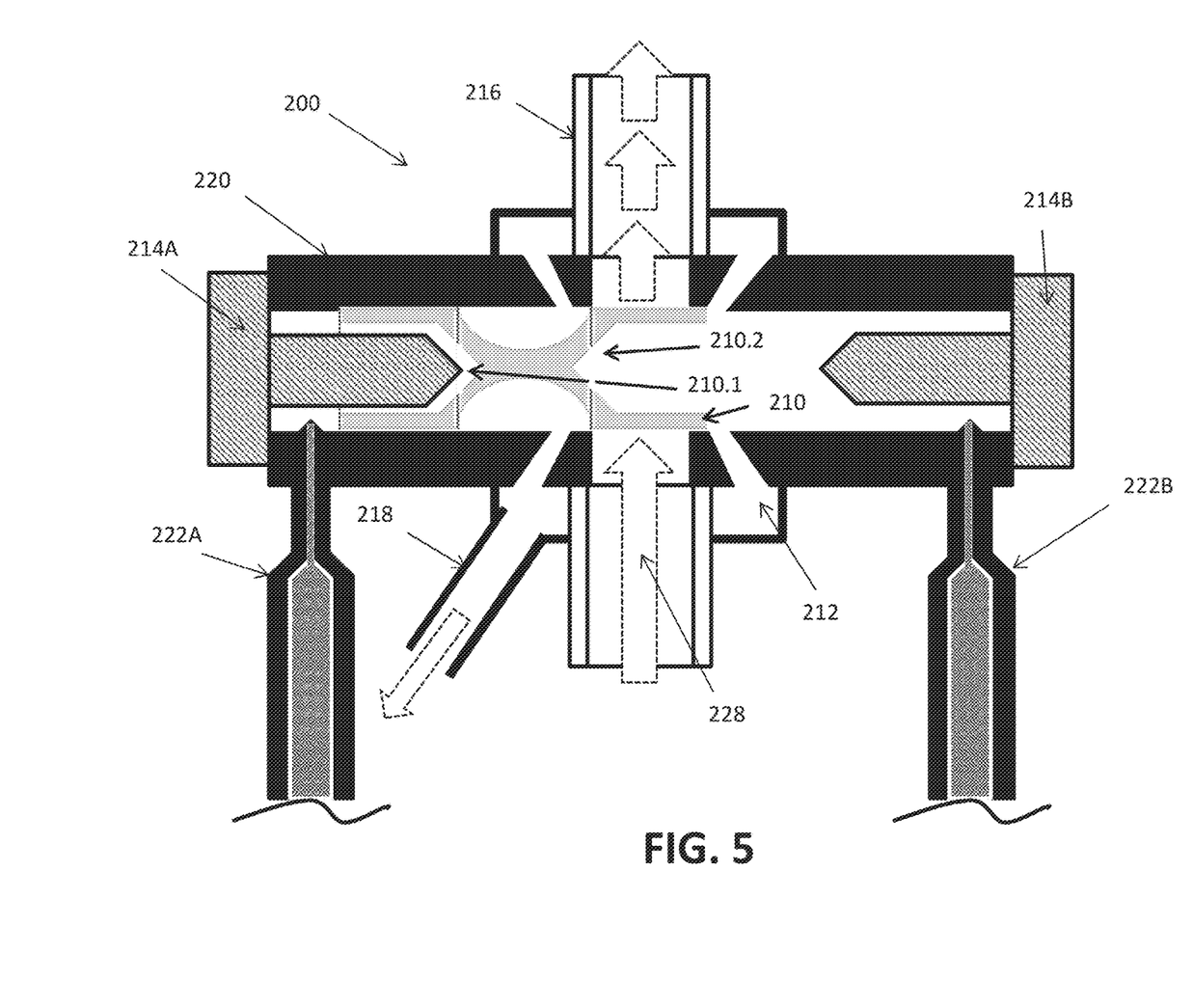
FIG. 5 is a partial cross-sectional view of a piezo-actuated valve in a third position in accordance with one or more embodiments of the present disclosure.

The shuttle valve assembly 210 is moveable between three positions. Specifically, the shuttle valve assembly 210 is moveable between a first position at a first end A in which the shuttle valve assembly 210 inhibits air and/or fluid flow through a passageway 228 of the tube 220 through the third opening as shown in FIG. 5. As shown, this is a closed position regarding a flow through the passageway 228.

Figure 4:
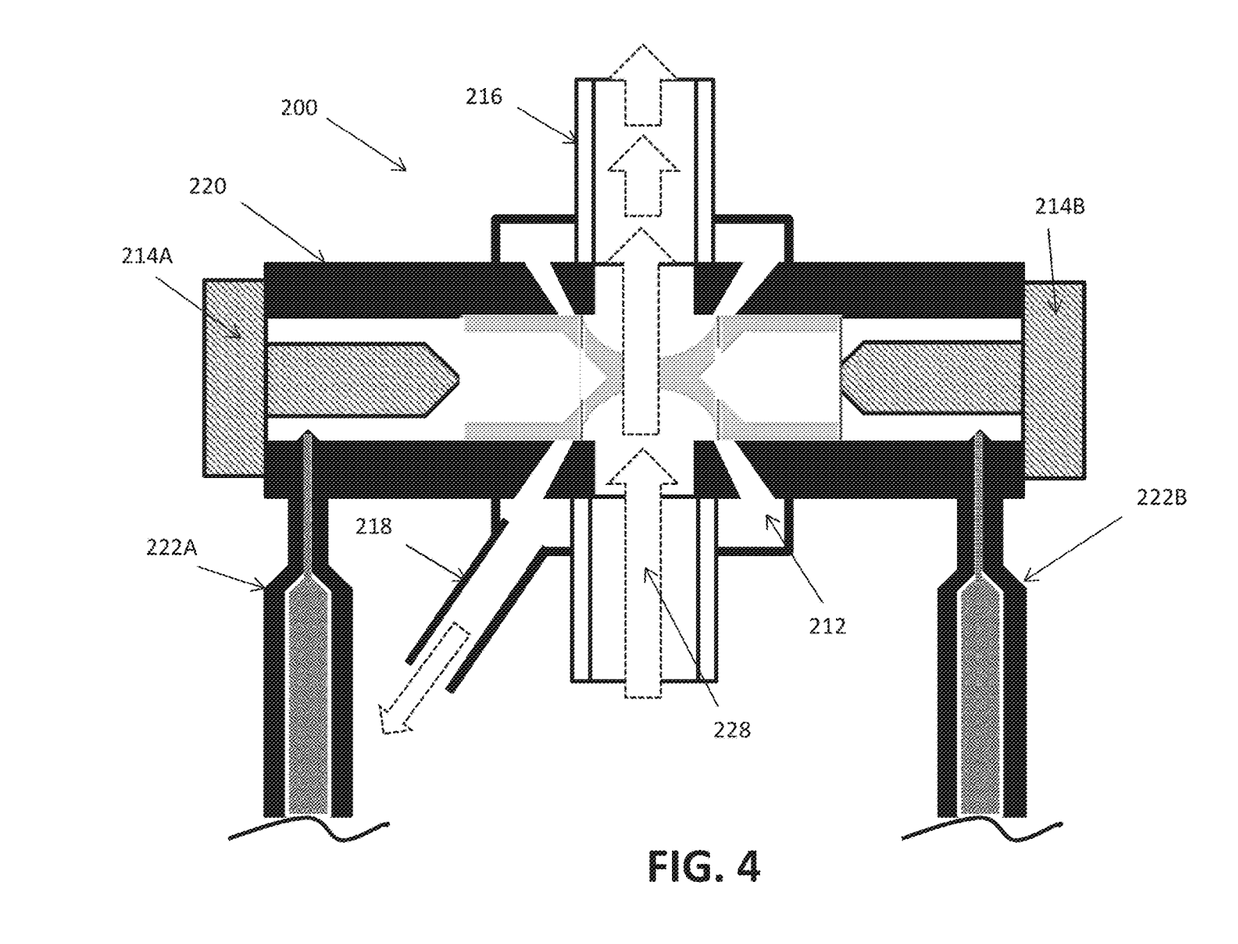
FIG. 4 is a partial cross-sectional view of a piezo-actuated valve in a second position in accordance with one or more embodiments of the present disclosure.

The shuttle valve assembly 210 is also moveable into a second position, which can be called an open position, at the center of the valve body 220 in which an aperture of the shuttle valve assembly 210 is at least partially disposed within the passageway 228 to facilitate air and/or fluid flow through the passageway 228 as shown in FIG. 4.

Further, the shuttle valve assembly 210 is moveable into a third position as shown in FIG. 3. The third position is at a second end B in which the shuttle valve assembly 210 inhibits air and/or fluid flow through the passageway 228 of the tube 220 through the third opening.

The piezo-actuated valve 200 also includes a first piezo injector 222A having an injector tip extending through the first opening 222.1. The piezo-actuated valve 200 also includes a second piezo injector 222B having an injector tip extending through the second opening 222.2. The first piezo injector 222A is configured to selectively provide a first fluid pulse to move the shuttle valve assembly 210 from the first position towards the second position and third position. Further, the second piezo injector 222B is configured to selectively provide a second fluid pulse to move the shuttle valve assembly 210 from the third position towards the second position and the first position.

The piezo-actuated valve 200 also includes the first stopper 214A that defines a first hard stop disposed opposite the second stopper 214B. The first hard stop configured to engage the shuttle valve assembly 210 to inhibit further travel of the shuttle valve assembly towards the first position. The piezo-actuated valve 200 also includes the second stopper 214B that defines a second hard stop disposed opposite the first stopper 214A. The second hard stop is configured to engage the shuttle valve assembly 210 to inhibit further travel of the shuttle valve assembly 210 towards the third position.

Further, according to another embodiment, the piezo-actuated valve 200 also includes a plurality of vent ports 212 radially extending through the valve body 220 and disposed adjacent to the third opening, the plurality of vent ports fluidly connects the exhaust port 218.

Figure 6:
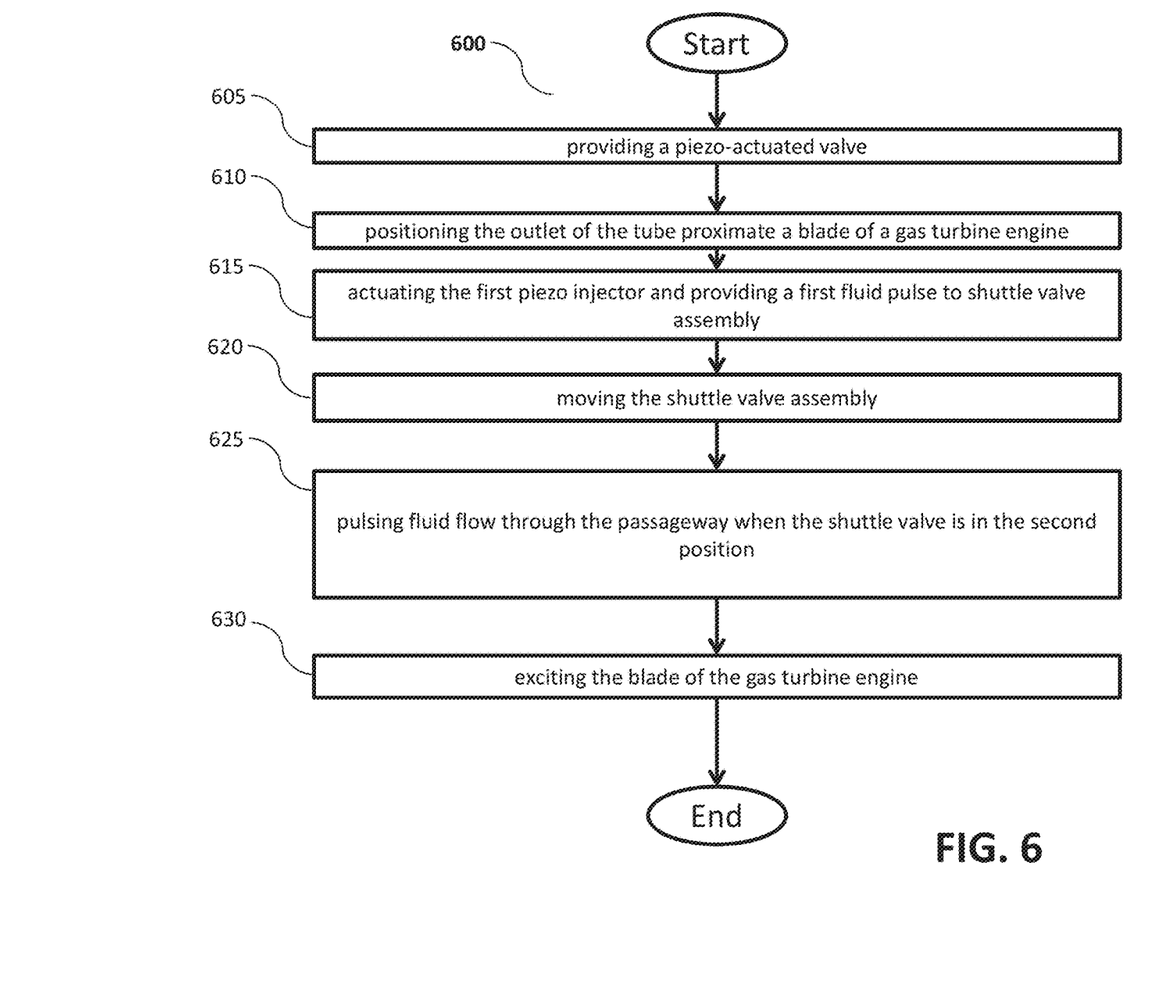
FIG. 6 is a flow chart of a method of implementing a piezo-actuated valve in accordance with one or more embodiments of the present disclosure.

FIG. 6 is a flow chart of a method 600 of implementing a piezo-actuated valve in accordance with one or more embodiments of the present disclosure. The method 600 includes providing a piezo-actuated valve having a valve body defining a valve cavity disposed between a first opening and a second opening, a tube extending from the valve body from a third opening in the center of the valve body defining a passageway extending between an inlet and an outlet, a shuttle valve assembly disposed within the valve cavity slidably disposed within the valve body, wherein the shuttle valve in configured to slide between the first end to a first stopper and the second end to a second stopper, a first piezo injector having an injector tip extending through the first opening; and a second piezo injector having an injector tip extending through the second opening (operation 605). The method 600 also includes positioning the outlet of the tube proximate a blade of a gas turbine engine (operation 610).

Further, the method includes actuating the first piezo injector and providing a first fluid pulse to shuttle valve assembly from the first piezo injector (operation 615). The method also includes moving the shuttle valve assembly between a first position at a first end in which the shuttle valve assembly inhibits fluid flow through a passageway of the tube through the third opening to a second position at the center of the valve body in which an aperture of the shuttle valve assembly is at least partially disposed within the passageway to facilitate fluid flow through the passageway, and a third position at a second end in which the shuttle valve assembly inhibits fluid flow through the passageway of the tube through the third opening (operation 620). The method 600 also includes pulsing fluid flow through the passageway when the shuttle valve is in the second position (operation 625) and exciting the blade of the gas turbine engine (operation 630).

Further according to another embodiment, the method may also do similar steps but for the second piezo injector moving the shuttle valve assembly the opposite direction. Specifically, the method may further include actuating the second piezo injector, providing a second fluid pulse to shuttle valve assembly from the second piezo injector, moving the shuttle valve assembly between a third position, second position, and first position, pulsing fluid flow through the passageway when the shuttle valve is in the second position, and exciting the blade of the gas turbine engine.

Advantageously, embodiments described herein provide enhanced testing abilities. This high speed electronically controlled piezo valve design allows for very precise, high speed excitation and measurement of blade aerodynamic stability and stress at engine speeds and pulse generation frequencies beyond existing technology. The simplicity and direct action of the valve system starts with a precisely timed electronic trigger signal that activates a piezo actuated injector which then allows high pressure fluid to drive a shuttle valve open then closed in under a millisecond. The "muscle" is the high pressure (incompressible) fluid controlled by a timed pulse from the piezo injector. The shuttle creates an air pulse that is ejected at the air valve exit at cycling frequencies that allows flutter and stability studies of engine performance hitherto unobtainable by existing systems that can help provide safety and reliability in prevention of blade flutter.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A piezo-actuated valve, comprising:
    a valve body extending along a first axis between a first end and a second end, the valve body defining a first opening disposed proximate the first end, a second opening disposed proximate the second end, a third opening centrally located on the valve body, and a valve cavity disposed between the first opening and the second opening;
    a tube connected to the third opening and extending from the valve body along a second axis disposed transverse to the first axis, the tube defining a passageway that extends across the valve body along the second axis from an inlet at a first side of the valve body to an outlet at a second side of the valve body located opposite the inlet and aligned with the inlet along the second axis;
    a shuttle valve assembly slidably disposed within the valve body, wherein the shuttle valve assembly is configured to slide between the first end to a first stopper and the second end to a second stopper;
    a first piezo injector having an injector tip extending through the first opening; and
    a second piezo injector having an injector tip extending through the second opening.

2. The piezo-actuated valve of claim 1, wherein the tube further comprises an exhaust port configured to allow a fluid pulse from at least one of the first piezo injector and the second piezo injector to escape when the shuttle valve assembly slidably moves between the first end and the second end.

3. The piezo-actuated valve of claim 1, wherein the shuttle valve assembly is movable between:
    a first position at a first end in which a first portion of the shuttle valve assembly is interposed between the inlet and the outlet thereby inhibiting fluid flow through the passageway of the tube through the third opening;
    a second position at a center of the valve body in which an aperture of the shuttle valve assembly is at least partially disposed within the passageway to facilitate fluid flow through the passageway and deliver the fluid flow from the inlet, across the valve body, and to the outlet; and
    a third position at a second end in which a second portion of the shuttle valve assembly is interposed between the inlet and the outlet thereby inhibiting fluid flow through the passageway of the tube through the third opening,
    wherein the shuttle valve closes both the inlet and the outlet when in the first position and in the third position.

4. The piezo-actuated valve of claim 3, wherein the first piezo injector is configured to selectively provide a first fluid pulse to move the shuttle valve assembly from the first position towards the second position and the third position.

5. The piezo-actuated valve of claim 4, wherein the second piezo injector is configured to selectively provide a second fluid pulse to move the shuttle valve assembly from the third position towards the second position and the first position.

6. The piezo-actuated valve of claim 5, wherein the first stopper defines a first hard stop disposed opposite the second stopper, the first hard stop configured to engage the shuttle valve assembly to inhibit further travel of the shuttle valve assembly towards the first position.

7. The piezo-actuated valve of claim 6, wherein the second stopper defines a second hard stop disposed opposite the first stopper, the second hard stop configured to engage the shuttle valve assembly to inhibit further travel of the shuttle valve assembly towards the third position.

8. The piezo-actuated valve of claim 2, wherein the valve body defines a plurality of vent ports radially extending through the valve body and disposed adjacent to the third opening, the plurality of vent ports fluidly connects the exhaust port.

9. A pulse device for exciting gas turbine engine turbomachinery, comprising:
   a piezo-actuated valve having
      a valve body defining a first opening at a first end, a second opening at a second end, a valve cavity disposed between the first opening and the second opening, and a third opening disposed midway through the valve cavity,
      a tube connected to the third opening and extending from the valve body along a second axis disposed transverse to the first axis, the tube defining a passageway that extends through the valve body along the second axis from an inlet at a first side of the valve body to an outlet at a second side of the valve body located opposite the inlet and aligned with the inlet along the second axis, and
      a shuttle valve assembly slidably disposed within the valve body, wherein the shuttle valve assembly is configured to slide between the first end to a first stopper and the second end to a second stopper;
   a first piezo injector having an injector tip extending through the first opening;
   a second piezo injector having an injector tip extending through the second opening;
   a delivery system fluidly connected to the first piezo injector and the second piezo injector; and
   a control system operatively connected to the first piezo injector and the second piezo injection, configured to actuate the first piezo injector to provide a first fluid pulse and the second piezo injector to provide a second fluid pulse.

10. The pulse device of claim 9, wherein the inlet is fluidly connected to a fluid source and the outlet faces towards a blade of a gas turbine engine.

11. The pulse device of claim 10, wherein the shuttle valve assembly is movable between:
   a first position at a first end in which a first portion of the shuttle valve assembly is interposed between the inlet and the outlet thereby inhibiting fluid flow through the passageway of the tube through the third opening;
   a second position at a center of the valve body in which an aperture of the shuttle valve assembly is at least partially disposed within the passageway to facilitate fluid flow through the passageway and deliver the fluid flow from the inlet, across the valve body, and to the outlet; and
   a third position at a second end in which a second portion of the shuttle valve assembly is interposed between the inlet and the outlet thereby inhibiting fluid flow through the passageway of the tube through the third opening, wherein the shuttle valve closes both the inlet and the outlet when in the first position and in the third position.

12. The pulse device of claim 11, wherein in response to the control system providing a first activation signal to the first piezo injector, the first piezo injector provides the first fluid pulse to the shuttle valve assembly to move the shuttle valve assembly from the first position towards the second position and the third position.

13. The pulse device of claim 12, wherein in response to the control system providing a second activation signal to the second piezo injector, the second piezo injector provides the second fluid pulse to the shuttle valve assembly to move the shuttle valve assembly from the third position towards the second position and the first position.

14. The pulse device of claim 13, wherein the valve body defines a plurality of vent ports radially extending through the valve body and disposed adjacent to the third opening, the plurality of vent ports fluidly connects an exhaust port.

15. The pulse device of claim 13, wherein the first activation signal and the second activation signal is based on at least one of a rotational speed of a gas turbine engine speed and a condition of the gas turbine engine.

16. The pulse device of claim 13, wherein the first piezo injector has an operating frequency up to 6000 Hz, and wherein the second piezo injector has operating frequency up to 6000 Hz.

17. The pulse device of claim 9, wherein the delivery system is configured to provide a high pressure working fluid to the first piezo injector and the second piezo injector.

18. A method of exciting gas turbine turbomachinery blades, comprising:
   providing a piezo-actuated valve having a valve body defining a valve cavity disposed between a first opening and a second opening, a tube extending from the valve body from a third opening in a center of the valve body defining a passageway extending between an inlet at a first side of the valve body and an outlet at a second side of the valve body opposite the first side, a shuttle valve assembly disposed within the valve cavity slidably disposed within the valve body, wherein the shuttle valve assembly is configured to slide between the first end to a first stopper and the second end to a second stopper, a first piezo injector having an injector tip extending through the first opening; and a second piezo injector having an injector tip extending through the second opening; and
   positioning the outlet of the tube proximate a blade of a gas turbine engine such that the passage extends across the valve body and the inlet is aligned with the outlet along a shared axis.

19. The method of claim 18, further comprising:
   actuating the first piezo injector;
   providing a first fluid pulse to the shuttle valve assembly from the first piezo injector;
   moving the shuttle valve assembly between a first position at a first end in which a first portion of the shuttle valve assembly is interposed between the inlet and the outlet thereby inhibiting fluid flow through a passageway of the tube through the third opening to a second position at the center of the valve body in which an aperture of the shuttle valve assembly is at least partially disposed within the passageway to facilitate fluid flow through the passageway and deliver the fluid flow from the inlet, across the valve body, and to the outlet, and the third position at a second end in which a second portion of the shuttle valve assembly is interposed between the inlet and the outlet thereby inhibiting fluid flow through the passageway of the tube through the third opening;
   pulsing fluid flow through the passageway when the shuttle valve assembly is in the second position;
   exciting the blade of the gas turbine engine;
   actuating the second piezo injector;
   providing a second fluid pulse to shuttle valve assembly from the second piezo injector;
   moving the shuttle valve assembly between a third position, a second position, and a first position;

pulsing fluid flow through the passageway when the shuttle valve is in the second position; and exciting the blade of the gas turbine engine, wherein the shuttle valve closes both the inlet and the outlet when in the first position and in the third position.

\* \* \* \* \*